Jan. 19, 1965   A. J. HOPPER   3,166,093
CHECK VALVE
Filed March 6, 1963

INVENTOR.
ARTHUR J. HOPPER.
BY Charles L. Lovercheck
     attorney 3,166,093
CHECK VALVE
Arthur J. Hopper, 1408 W. Grandview Blvd., Erie, Pa.
Filed Mar. 6, 1963, Ser. No. 263,264
4 Claims. (Cl. 137—512.15)

This invention relates to check valves and, more particularly, to the variety of check valves for use in pipe lines and conduits to allow fluid to flow in one direction and to prevent the flow of fluid in the opposite direction.

Valves of the general character disclosed herein have presented particular problems in connection with the sealing of the valve member and body and in supporting the valve member in the body. A valve is disclosed herein having a particularly improved supporting member for the valve members which is especially useful in very large check valves; for example, in valves having a body of more than one foot in diameter.

It is, accordingly, an object of the present invention to provide an improved valve.

Another object of the invention is to provide an improved check valve.

Still another object of the invention is to provide an improved supporting member for the valve members in a check valve.

A further object of the invention is to provide a valve which is simple in construction, economical to manufacture, and simple and efficient in operation.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

Figure 2:
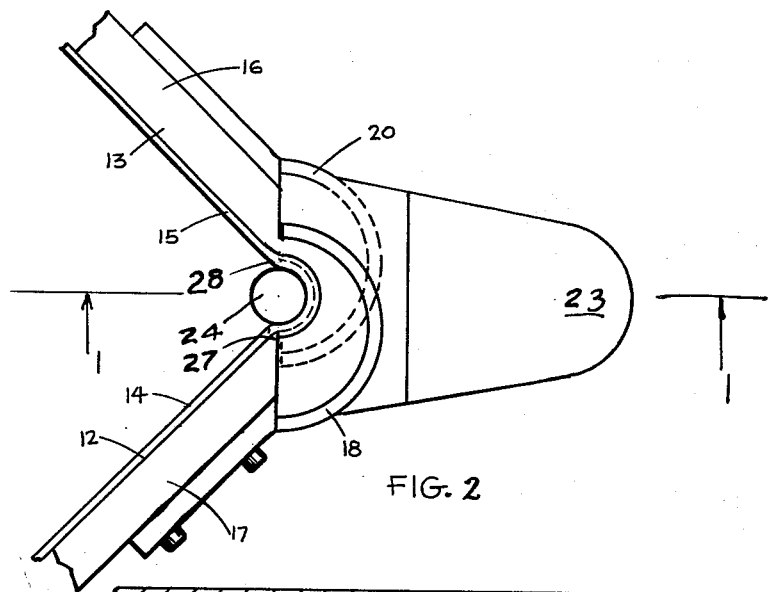
FIG. 2 is a side view of the valve member supporting structure shown separate and apart from the valve.
Figure 1:
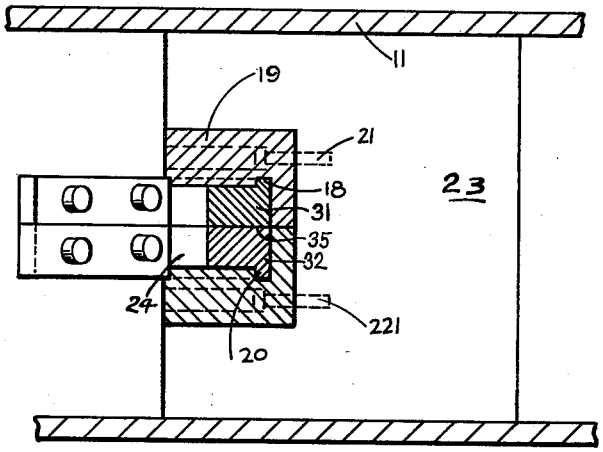
FIG. 1 is a longitudinal cross sectional view of a valve according to the invention taken on line 1—1 of FIG. 2.
Figure 3:
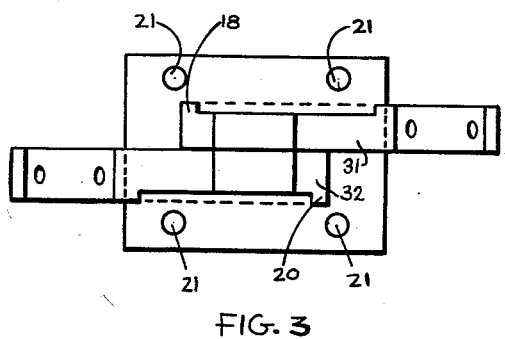
FIG. 3 is a top view of the support member shown in FIG. 2 showing a part of the conduit in a single line schematic arrangement.

Now with more particular reference to the drawing, a valve body 11 is shown in the form of a cylindrical conduit having an inlet end and an outlet end. Supported inside the body 11 is a cross member 23 fixed at its ends to the inside walls of the body. A support member 19 is fixed to the cross member 23. The member 19 has wing members 16 and 17 swingably supported thereon. These wing members are made of rigid plate like members which are oval shaped on the outside. The valve itself is of the general type shown in Patent No. 2,898,080.

Rubber sheet like sealing members 14 and 15 are fixed to the members 16 and 17 by sealing or otherwise. The resilient members 14 and 15 are integrally connected around a center post 24. The center post 24 is disposed in a recess in the support member 19.

The support member 19 is made of two halves and fixed to the cross member 23 which is disposed in a slot in the support member 19. The support member 19 is fixed to the cross member 23 by means of bolts 21 and 221.

The member 19 has two opposed arcuate slots with the slots, one in each half, receiving arcuate flanges 18 and 20 which extend laterally from brackets 31 and 32. Surfaces 35 engage each other and hold the flanges in the grooves. The slots are each curved around a center of curvature of the upper ends of the wing members 16 and 17 at 27 and 28, respectively. Thus, the wing members on the valve swing around the pivot points 27 and 28 and thereby roll around the periphery of the center post 24.

A perfect seal is formed by the sealing members 14 and 15; yet, the weight of the valve vanes is carried by the member 19 which supports the valve members on the flanges 18 and 20.

The foregoing specification sets forth the invention in its preferred practical forms but it is understood that the structure shown is capable of modification within a range of equivalents without departing from the invention which is to be understood is broadly novel as is commensurate with the appended claims.

The embodiments of the invention in which an exclusive property or privilege is claimed are defined as follows:

1. A valve comprising a hollow, generally cylindrical body having an inlet and an outlet, a cross member attached at its opposite ends to the inside walls of said hollow body and defining a flow passage along each side of said cross member, a recess in the downstream side of said cross member, two support members in said recess, each said support member having an arcuate groove cut therein on the downstream side thereof, two axle members, one disposed in each said arcuate groove, rigid wing members fixed to said axle members, a sheet of flexible material on the downstream side of said wing members and extending from one said wing member to the other, and a central axle on the downstream side of said sheet and supporting a part of said sheet between said central axle and said axle members, said wing members being swingable to a position together with each other whereby fluid can flow through said body from the upstream side thereof to the downstream side, said wing members being swingable to rotate said axle members in said cross member to bring said wing members into sealing engagement with the inner wall of said hollow body, the center of rotation of each said axle member being disposed on the upstream inner edge of each said wing member.

2. A valve comprising a hollow body, a supporting member in said body, an axle attached to said body and extending across the inside thereof, said supporting member having two arcuate L-shaped slots therein, two oval wings, and an arcuate L-shaped flanged member attached to each said wing with one leg of each L-shaped flanged member disposed in alignment with a corresponding leg of the other said flanged member, each said flanged member being complementary in shape to one said slot, one of said flanged members being attached to one said wing, the other said flanged member being attached to the other said wing, a side defining an inside surface of each said wing defining the said flanged member, said inside surfaces being in sliding engagement each with the other whereby said flanged members are held in said slots.

3. The valve recited in claim 2 wherein the center of curvature of said slots is disposed at the end of the inside surface of one said wing.

4. A valve comprising
a hollow body,
a supporting member in said body,
an axle attached to said body and extending across the inside thereof,
said supporting member having two arcuate L-shaped slots therein,
two oval wings,
an arcuate flanged member attached to each said wing,
each said flanged member being complementary in shape to one said slot,
one of said flanged members being attached to one said wing,
the other said flanged member being attached to the other said wing,
the center of curvature of said slots being disposed at the end of the inside surface of one said wing, said valve having an axle extending from one side of the inside wall to the other,
and a flexible sheet of material fixed to the upstream sides of said wings,
said flexible material extending continuously from one said wing to the other.

References Cited in the file of this patent
UNITED STATES PATENTS

| | | |
|---|---|---|
| 1,087,981 | Reynolds | Feb. 24, 1914 |
| 1,708,907 | Spencer | Apr. 9, 1929 |
| 2,898,080 | Smith | Aug. 4, 1959 |